United States Patent [19]

Dighe

[11] Patent Number: 5,325,427
[45] Date of Patent: Jun. 28, 1994

[54] APPARATUS AND ROBUST METHOD FOR DETECTING TONES

[75] Inventor: Rajiv S. Dighe, Howell, N.J.

[73] Assignee: AT&T Bell Laboratories, Murray Hill, N.J.

[21] Appl. No.: 857,552

[22] Filed: Mar. 23, 1992

[51] Int. Cl.$^5$ .......................................... H04M 3/00
[52] U.S. Cl. .................................. 379/386; 379/283
[58] Field of Search ...................... 379/386, 282, 283; 340/825.48, 825.71; 367/199

[56] References Cited

U.S. PATENT DOCUMENTS 4,833,399 5/1989 So .
4,990,848 2/1991 So .

FOREIGN PATENT DOCUMENTS 213651 3/1987 European Pat. Off. ........ H04Q 1/46
347038 12/1989 European Pat. Off. ...... H04Q 1/457

OTHER PUBLICATIONS

"A New Digital DTMF Receiver" by V. K. Jain pp. 189–195.
"Digital MF Receiver Using Discrete Fourier Transform" by Ivan Koval & George Gara, pp. 1337–1335.
"Prolate Spheroidal Wave Functions, Fourier Analysis, and Uncertainty—V: The Discrete Case", D. Slepian, The Bell System Technical Journal, vol. 57, No. 5, May 1978, pp. 1371–1430.

Primary Examiner—James L. Dwyer
Assistant Examiner—Creighton Smith
Attorney, Agent, or Firm—T. Stafford

[57] ABSTRACT

A robust tone detector is realized by applying a single taper, which provides a relatively narrow bandwidth filter, to a received signal and, then, performing a Discrete Fourier Transform of the tapered signal. The result of the Fourier transform is used to obtain an estimate of energy in the frequency domain of the expected tone. A prescribed selection algorithm based on the relationship of the received signal energy in the time domain and the energy estimate in the frequency domain is used to determine whether a valid tone has been received. Robustness of the tone detector is improved by performing a plurality of Discrete Fourier Transforms of the single tapered version of the received signal at a corresponding plurality of frequencies relative to the nominal frequency of an expected one or more tones. A further improvement in the tone detector is obtained by the dynamically adjusting tone acceptance thresholds based on a measure of channel impairments.

26 Claims, 5 Drawing Sheets

APPARATUS AND ROBUST METHOD FOR DETECTING TONES

TECHNICAL FIELD

This invention relates to signal detectors and, more particularly, to tone detectors.

BACKGROUND OF THE INVENTION

Use of tones is widespread in telephony. They are used in setting up a telephone call and to indicate the progress of the call. More recently, tones have been employed during calls to effect advanced features and/or functions. One example is the use of dual-tone multifrequency (DTMF) signals to control the addition of one or more individuals during a conference call.

A serious problem with prior tone detectors is that they falsely detect speech, music or data as tones used for other purposes. That is, the speech, music or data emulates either the individual tones or the DTMF signals. Such false detection of tones during a telephone call causes a so-called "talk-off" condition, i.e., a disruption of the call, resulting in a failure of the communications circuit. Another problem with prior arrangements is that valid tones or DTMF signals are falsely rejected in the presence of channel impairments, e.g., low signal-to-noise ratio.

A recent attempt at overcoming the talk-off problem and the falsely rejecting valid tones or DTMF signals problem employs a plurality of discrete prolate spheroidal sequence (DPSS) tapers, i.e., data windows, to slice a received signal into time segments. Then, Discrete Fourier Transforms (DFTs) of the tapered segments are taken to form estimates of the received signal energy in the frequency domain. The frequency domain energy estimates are then used to identify the received tone or DTMF signals.

Although this prior arrangement operates satisfactorily in certain applications, it still presents a significant talk-off problem when designed to operate satisfactorily in detecting valid tones or DTMF signals in the presence of channel impairments. This is primarily caused by only evaluating frequency domain energy and by the required use of a relatively wide-band filter in the frequency domain to accommodate the use of the plurality of DPSS tapers. Use of such a wide-band filter allows speech, music or data to easily emulate the individual tones and/or DTMF signals, thereby causing talk-off.

SUMMARY OF THE INVENTION

The problems of prior tone detectors are overcome, in accordance with the invention, by employing a single taper, i.e., data window, which provides a relatively "narrow" bandwidth filter and, then, performing at least one Discrete Fourier Transform of the single tapered version of the received signal at at least one prescribed frequency relative to the normal frequency of an expected tone. The result of the at least one Discrete Fourier Transform is used to obtain an estimate of the tone energy in the frequency domain. Then, a prescribed selection algorithm based on a relationship of the received signal energy in the time domain and the energy estimate in the frequency domain is used to determine whether or not a valid tone is being received.

Robustness of the tone detector is improved, in accordance with the invention, by performing a plurality of Discrete Fourier Transforms of the single tapered version of the received signal at a corresponding plurality of prescribed frequencies relative to the nominal frequency of an expected one or more tones to obtain frequency domain energy estimates for the one or more tones. The robustness of the tone detector is further enhanced, in accordance with the principles of the invention, by dynamically adjusting tone acceptance thresholds based on a measure of channel impairments.

A technical advantage of the invention is that the talk-off problem is decoupled from the problem of falsely rejecting valid tones or DTMF signals in the presence of channel impairments.

DETAILED DESCRIPTION

Figure 1:
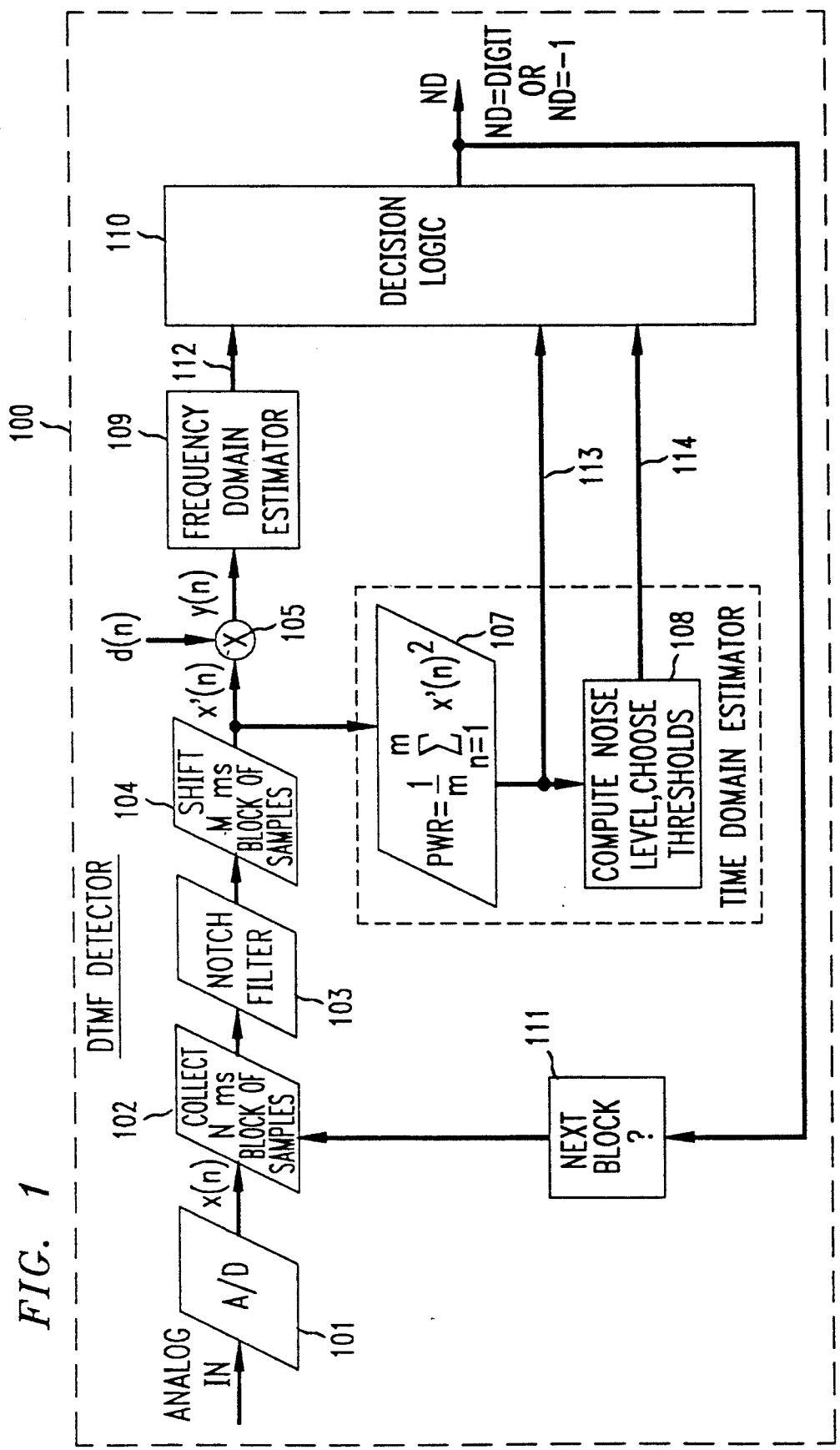
FIG. 1 shows, in simplified form, details of a dual-tone multifrequency (DTMF) detector, including an embodiment of the invention.

FIG. 1 shows, in simplified form, details of dual-tone multifrequency (DTMF) detector 100, including an embodiment of the invention. Such a DTMF detector 100 is readily implemented by programming a digital signal processor (DSP) unit of a type now well known in the art and commercially available. Any one of a number of such known DSP units can be employed for this purpose. DTMF detector 100 is employed to detect the now well known DTMF signals. Each DTMF signal includes one tone from a low band and one tone from a high band. The DTMF low band comprises 697 Hz, 770 Hz, 852 Hz and 941 Hz tones. The DTMF high band comprises 1209 Hz, 1336 Hz, 1477 Hz and 1633 Hz tones. There are sixteen (16) possible combinations resulting from the known 4×4 matrix of DTMF low band and high band tones, which combinations represent the values 0–9, *, #, A, B, C and D.

Specifically, shown in FIG. 1 is analog-to-digital (A/D) converter 101 which is employed to convert an analog incoming signal to digital PCM form. It is noted that in certain network applications the incoming signals is already in digital PCM form and A/D converter 101 would not be employed. Digital PCM samples x(n) are supplied from A/D 101, or otherwise, and are collected in storage unit 102 over a N msec interval of the incoming signal. In this example, the PCM sampling rate is 8 KHz and N is 5 msec and, therefore, a block of B=40 PCM samples are collected for the incoming PCM channel. Notch filter 103 is employed to filter out specific other tone frequencies not included in the DTMF signals. These other tone frequencies are for example, those associated with dial tone, call progress tones, 60 Hz power and the like. In this implementation, a known infinite impulse response (IIR) filter is employed for this purpose. The filtered samples are supplied from notch filter 103 to shift unit 104 where a block of M msec of samples is collected and stored for use in obtaining both time domain and frequency domain estimates of the received signal energy. The use of a shifted block of M msec of samples, where M is greater than N, is important in order to improve the resolution of the energy estimate in the frequency domain. The value of N is selected to improve the resolution of the duration of the signal in the time domain. In certain applications use of shift unit 104 to provide a so-called sliding taper may not be necessary.

In a particular DTMF detector implementations, it is desirable to accept individual tones having a frequency within ±1.5% of its nominal frequency $f_0$ and to reject individual tones having a frequency outside of ±3.5% of its nominal frequency $f_0$. It is also desirable to accept a received signal having a duration of at least 30 msec and to reject a signal having a duration of less than 23.5 msec. The signal is also rejected if the gap between successive signals is less than 25 msec. These requirements lead to N being 5 msec, as indicated above, and M being 15 msec, in one implementation. Consequently, shift unit 104 accumulates m=120 samples. The shifting of the M msec sample block is such that once a M msec block of samples has been accumulated a N msec block of B "old" samples is dropped and a N msec block of B "new" samples is added every N msec.

Figure 2:
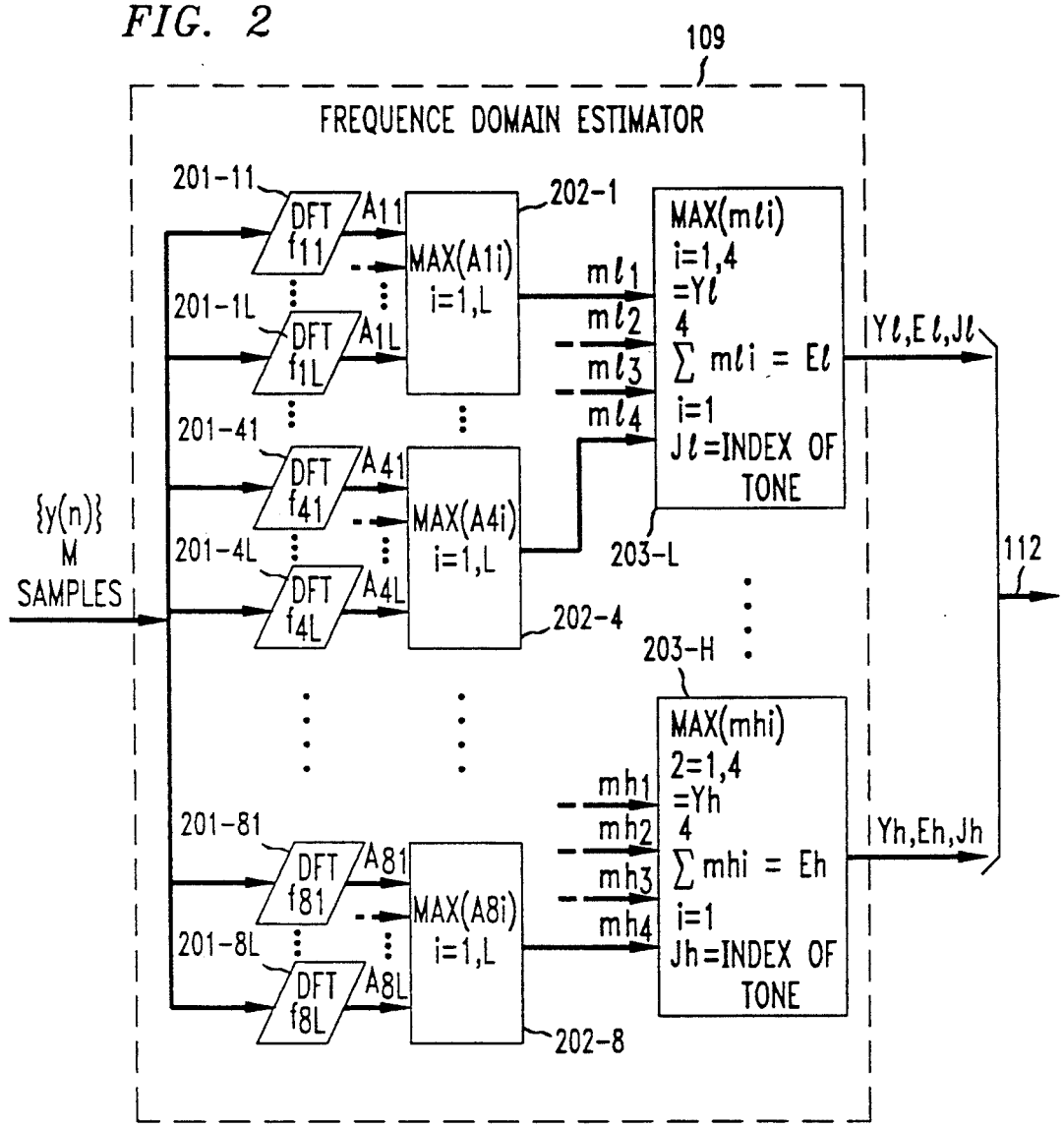
FIG. 2 shows, in simplified form, details of frequency domain estimator 109 of FIG. 1.

The shifted samples x'(n) are supplied to multiplier 105 where they are multiplied, in accordance with the invention, by a prescribed single discrete prolate spheroidal sequence (DPSS) taper d(n) to yield the tapered version y(n)=x'(n)d(n). Taper d(n) is obtained by use of the Toeplitz eigenvalue equation given by $$\lambda d(n) = \sum_{\tau=0}^{m-1} \frac{\sin 2\pi W(n - \tau)d(\tau)}{\pi(n - \tau)},$$

where $\lambda$ is a measure of the energy contained in ±W Hz, $\lambda_o$ is the largest eigenvalue, has the largest energy concentration in ±W Hz and its associated eigenvector $d_o(n)$ is defined as the zeroth (0th) order DPSS. It has been determined that use of the zeroth (0th) order DPSS taper $d_0(n)$ with a desired frequency separation of W Hz for a M msec block of samples will provide the maximum energy concentration of the signal in a frequency bandwidth of ±W Hz around a desired frequency. In this example, W is selected to be 50 Hz. This will provide a good estimate of the energy in the frequency domain. Use of DPSS tapers is known and is described in an article by D. Slepian entitled "Prolate Spheroidal Wave Functions, Fourier Analysis, and Uncertainty—V: The Discrete Case," *Bell System Technical Journal*, Vol. 57, 1371-1430 (1978). The tapered version y(n) of samples x'(n) is supplied to frequency domain estimator 109 where the estimate of the two tones comprising the DTMF signal is obtained. Details of frequency domain estimate 109 are shown in FIG. 2 and described below.

The shifted samples x'(n) are also supplied to time domain estimator 106 and, therein, to power estimator unit 107. An estimate of the power (PWR) in the shifted M msec block of samples x'(n) is obtained by $$PWR = \frac{1}{m} \sum_{n=1}^{m} x'(n)^2.$$

Figure 3:
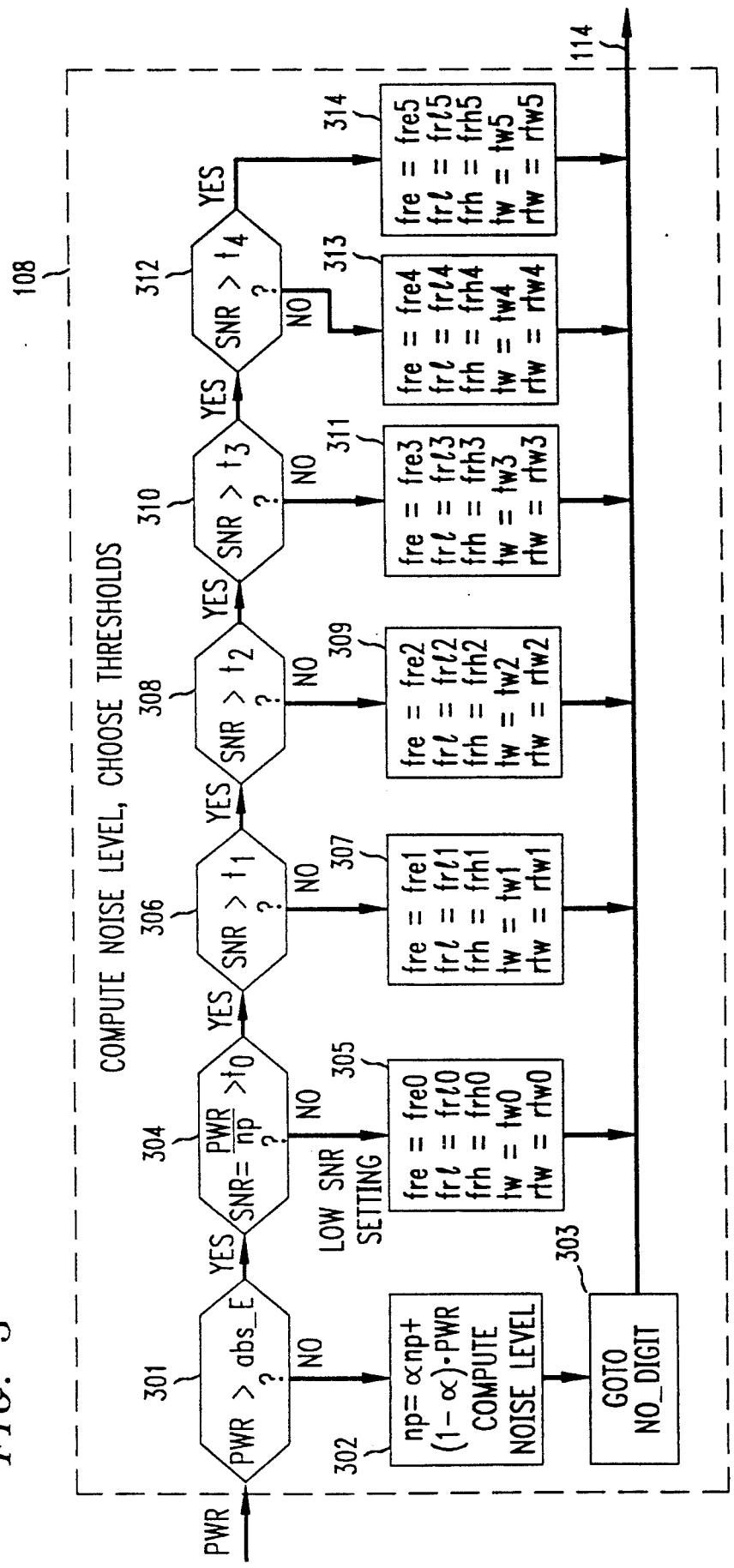
FIG. 3 shows, in simplified form, details of compute noise level, choose thresholds unit 108 of FIG. 1.

This power estimate (PWR) is supplied to decision logic 110 via bus 113 and to compute noise level, choose thresholds unit 108. In unit 108 a measure of signal-to-noise ratio (SNR) and/or a measure of noise power (np) is obtained. The SNR is then employed in unit 108, in accordance with the principles of the invention, to dynamically obtain one of a plurality of sets of threshold values. The set of threshold values are supplied via bus 114 to decision logic 110, where they are employed to determine whether or not the incoming signal is a valid DTMF signal. Details of compute noise level, choose thresholds unit 108 are shown in FIG. 3 and described below.

The frequency domain energy estimate and the time domain energy estimate along with the set threshold values are employed in decision logic 110 to determine whether or not a valid new DTMF signal has been detected. Thereafter, next block unit 111 causes the DTMF detector 100 to wait until the next N msec of samples are accumulated in unit 102 before determining if a new valid DTMF signal has been received.

FIG. 2 shows, in simplified form, details of frequency domain estimator 109. Specifically, shown are groups 200-1 through 200-8, each including L Discrete Fourier Transform (DFT) units 201. Groups 200-1 through 200-8 are associated on a one-to-one basis with the DTMF tones F1 through F8, respectively, for obtaining L DFTs in prescribed relationship to the nominal frequency of the specific tone. By way of example, only group 200-1 will be described in detail-groups 200-2 through 200-8 will be identical in operation except for the nominal frequencies of the DTMF tones f2 through f8. Thus, group 200-1 includes Discrete Fourier Transform (DFT) units 201-11 through 201-1L that are employed to obtain Discrete Fourier Transforms A11 through A1L, respectively, of the tapered version of the input signal samples y(n) at frequencies f11 through f1L, respectively. In this example, frequencies f11 through f1L are in a prescribed relationship to the nominal frequency of tone f1, which in this example is 697 Hz. The specific frequencies at which the Discrete Fourier Transforms are taken are dependent on the number L and the frequency acceptance criteria for a valid time. In this specific example, as indicated above, the frequency acceptance criteria is that the frequency of the received tone must be within ±1.5% of the nominal frequency of tone f1 for it to be accepted as a valid tone. By way of example, if we choose L to be 3, then, f11 is f1−0.75%, f12 is f1 and f13 is f1+0.75%. Again, f1 is 697 Hz. If we choose L to be 4, then, f11 is f1−0.9%, f12 is f1−0.3%, f13 is f1+0.3% and f14 is f1+0.9%. For other values of L, it will be apparent to those skilled in the art how to select the frequency values from the above examples. Discrete Fourier Transform values are obtained at similar frequencies for the remaining seven (7) DTMF tones. There are well known arrangements and techniques for generating Discrete Fourier Transforms of signals. In this implementation, the Goertzel algorithm is used as described in a book authored by A. V. Oppenheim and R. W. Schafer, entitled *Digital Signal Processing*, Prentice Hall, Inc., N.J., pp. 287-289. (1975).

The group of L Discrete Fourier Transforms for each DTMF tone f1 through f8 is supplied to an associated maximum amplitude estimator 202-1 through 202-8. Each of maximum amplitude estimators 202-1 through 202-8 selects the maximum amplitude from each of its L associated Discrete Fourier Transforms. For the low band tones these maximum amplitude values are designated ml1 through ml4 corresponding to tones f1 through f4, respectively. For the high band tones the maximum amplitude values are designated mh1 through mh4, corresponding to tones f5 through f8, respectively. The low band maximum values ml1 through ml4 are supplied to low band energy selection unit 203-L and the high band maximum values mh1 through mh4 are supplied to high band energy selection unit 203-H. Unit 203-L obtains the maximum one of ml1 through ml4 and designates it Yl. Additionally, unit 203-L computes the sum of ml1 through ml4 and designates that value El. Unit 203-L also stores the index Jl of the low band tone having the maximum Discrete Fourier Transform amplitude value. Unit 203-H obtains the maximum one of mh1 through mh4 and designates it Yh. Additionally, unit 203-H computes the sum of mh1 through mh4 and designates that value Eh. Unit 203-H also stores the index Jh of the high band tone having the maximum Discrete Fourier Transform amplitude value. The values Yl, El, Jl, Yh, Eh and Jh are supplied from frequency domain estimator 109 via bus 112 to decision logic 110 (FIG. 1).

FIG. 3 shows, in simplified form, details of compute noise level, choose thresholds unit 108. Specifically, the power estimate (PWR) is supplied to absolute energy test unit 301 where it is determined whether or not PWR<abs_E. Absolute energy value (abs_E) may be set at any desired level depending on the particular implementation. In this example, abs_E is selected to be −39 dBm. If the test result in unit 301 is NO, it indicates that the received signal does not include a valid DTMF signal and the incoming signal noise power (np) is computed in unit 302, namely, np=$\alpha$np+(1−$\alpha$).PWR, where $$\alpha = 1 - \frac{N}{\tau}$$

is a number less than one (1) and $\tau$ is an averaging interval. In this example, N is 5 msec and $\tau$ is 120 msec.

Once noise power np is computed, unit 303 goes to NO_DIGIT unit 402, which generates an indication that no new valid "digit", i.e., no new valid DTMF signal has been received. Details of NO_DIGIT unit 402 are shown in FIG. 5 and described below.

Returning to unit 301, if the signal power (PWR) is greater than abs_E, unit 304 tests to determine whether the signal-to-noise ratio (SNR), namely, PWR/np>$T_0$ where, in this example, $T_0$ is 10 dB. If the test result in unit 304 is NO, there is a very low SNR of the incoming signal and unit 305 selects a first set of predetermined threshold values to be used in decision logic 110 in determining whether a valid DTMF signal has been detected. The set of threshold values include: "fre", which is the fraction of energy contained in the DTMF signal, i.e., tones, relative to the total energy in the received signal; "frl", which is the fraction of energy contained in the selected low band tone of the DTMF signal, relative to the total energy in the low band tones; "frh", which is the fraction of energy contained in the selected high band tone of the DTMF signal relative to the total energy of the high band tones; "tw", which is the ratio of the selected high band tone energy to the selected low band tone energy, commonly known as "twist", and "rtw", which is the ratio of the selected low band tone energy to the selected high band tone energy, commonly known as "reverse twist". In this example, not to be construed as limiting the scope of the invention, in the first set of threshold values fre0 is 0.7, fr10 is 0.8, frh0 is 0.8, tw0 is 7.5 and rtw0 is 12.5. It should be noted that these threshold values are particularly determined in conjunction with the M msec of samples used in obtaining the Discrete Fourier Transforms and the number L of Discrete Fourier Transforms for each tone frequency. Specifically, these threshold values are found in empirical fashion based on the values M and L. If the test result in unit 304 is YES, the SNR is further evaluated in unit 306 to determine if it is greater than a second threshold $T_1$. In this example, $T_1$ is selected to be 15 dB. If the test result in unit 306 is NO, the SNR is slightly improved over the 10 dB level and unit 307 selects a second set of threshold values fre1, frl1, frh1, tw1 and rtw1 to be used in decision logic 110 for determining whether or not a valid DTMF signal has been detected. In this example, not to be construed as limiting the scope of the invention, in the second set of threshold values fre1 is 0.74, frl1 is 0.8, frh1 is 0.8, tw1 is 7.5 and rtw1 is 10.5. If the test result in unit 305 is YES, the SNR is further evaluated in unit 308 to determine if it is greater than a third threshold 308. In this example, $T_2$ is selected to be 18 dB. If the test result in unit 308 is NO, the SNR is slightly improved over the 15 dB level and unit 309 selects a third set of threshold values to be used in determining whether or not a valid DTMF signal has been detected. In this example, not to be construed as limiting the scope of the invention, in the third set of threshold values fre2 is 0.875, frl2 is 0.9, frh2 is 0.9, tw2 is 7.5 and rtw2 is 5.5. If the test result in unit 308 is YES, the SNR is further evaluated in unit 310 to determine if it is greater than a fourth threshold $T_3$. In this example, $T_3$ is selected to be 20 dB. If the test result in unit 310 is NO, the SNR is slightly improved over the 18 dB level and unit 311 selectes a fourth set of threshold values to be used in determining whether or not a valid DTMF signal has been detected. In this example, not to be construed as limiting the scope of the invention, in the fourth set of threshold values fre3 is 0.915, frl3 is 0.9, frh3 is 0.925, tw3 is 7.4 and rtw3 is 5.5. If the test result in unit 310 is YES, the SNR is further evaluated in unit 312 to determine if it is greater than a fifth threshold $T_4$. In this example, $T_4$ is selected to be 23 dB. If the test result in unit 312 is NO, the SNR is slightly improved over the 20 dB level and unit 313 selects a fifth set of threshold values to be used in determining whether or not a valid DTMF signal has been detected. In this example, not to be construed as limiting the scope of the invention, in the fifth set of threshold values fre4 is 0.935, frl4 is 0.925, frh4 0.925, tw4 is 7.4 and rtw4 is 5.5. If the test result in unit 312 is YES, the SNR is greater than fifth threshold $T_4$ of 23 dB level and unit 315 selects a sixth set of threshold values to be used in determining whether or not a valid DTMF signal has been detected. In this example, not to be construed as limiting the scope of the invention, in the sixth set of threshold values fre5 is 0.94, frl5 is 0.925, frh5 is 0.95, tw5 is 7.4 and rtw5 is 5.5. The set of threshold values is supplied via bus 114 to decision logic 110.

Figure 4:
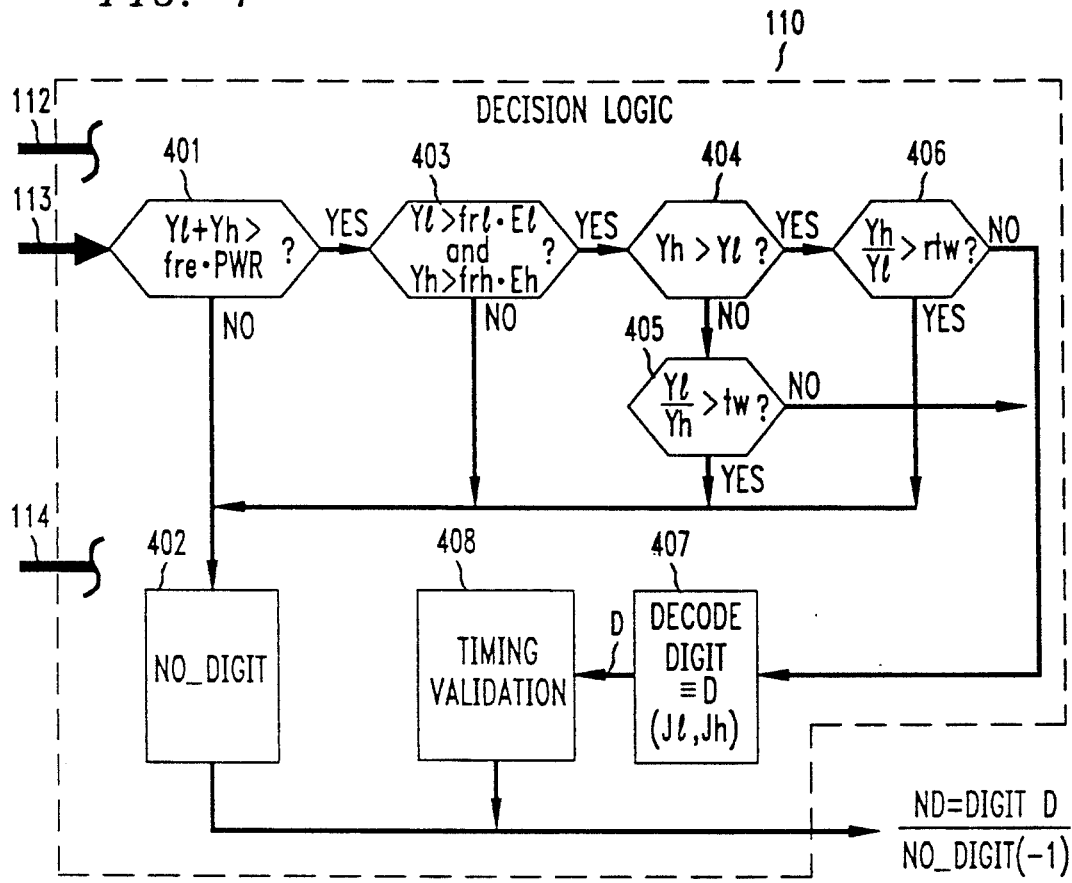
FIG. 4 shows, in simplified form, details of decision logic 110 of FIG. 1.

FIG. 4 shows, in simplified form, details of decision logic 110. Specifically shown in bus 112, which supplies values for Yl, El, Jl, Yh, Eh and Jh, from frequency domain estimator 109 to decision logic 110. Similarly, bus 113 supplies the incoming signal power value (PWR) to decision logic 110. Finally, bus 114 supplies the set of threshold values fre, frl, frh, tw and rtw from computer noise level, choose thresholds unit 108 to decision logic 110. Although not specifically shown, buses 112, 113 and 114 supply the noted values to appropriate ones of the units 401 and 403 through 406 in decision logic 110. Unit 401 tests to determine whether the fractional energy, i.e., Yl+Yh exceeds fre.PWR. If the test result in unit 401 is NO, a valid digit has not been received and NO_DIGIT unit 402 yields a NO_DIGIT indication, i.e., ND=−1. Again, details of NO_DIGIT unit 402 are shown in FIG. 5 and described below. If the test result in unit 401 is YES, further evaluation of the DTMF signal is performed in unit 403, which is the exclusivity test. This exclusivity test is used to determine if the relative power of the low band and high band tones in the DTMF signal are dominant over any other possible tones received in the low and high band. Therefore, unit 403 tests to determine if Yl>frl.El and Yh>frh.Eh. If the test result in unit 403 is NO, no no valid DTMF signal has been detected and NO_DIGIT unit 402 again yields a NO_DIGIT indication of ND=−1. If the test result in unit 403 is YES, unit 404 further tests to determine if the high band energy is greater than the low band energy. If the test result in unit 404 is NO, unit 405 tests to determine if the ratio of the energy of the low band tone relative to the energy of the high band tone in the DTMF signal is greater than threshold tw. Again, this is the test for so-called "twist". If the test result in unit 405 is YES, no valid DTMF signal has been detected and NO_DIGIT unit 402 once again yields a NO_DIGIT indication of ND=−1. If the test result in unit 405 is NO, the "twist" is acceptable and control is passed to decode digit unit 407 which yields the identity of the received "digit" as indicated by the indices Jl and Jh. If the test result in unit 404 is YES, unit 406 tests to determine whether "reverse twist" is acceptable, i.e., whether the ratio of Yh relative to Yl is greater than threshold rtw. If the test result in unit 406 is YES, again, no valid DTMF signal has been detected and NO_DIGIT unit 402 once again yields a NO_DIGIT indication of ND=−1. If, however, the test result in unit 406 is NO, a valid DTMF signal has been detected and the decode digit unit 407 yields the identity of the received "digit" as indicated by low band tone index Jl and high band tone index Jh. Thereafter, timing validation unit 408 determines whether the received DTMF signal meets the time domain constraints on the duration of the received DTMF signal and the gap between the current received valid DTMF signal and the reception of a subsequent valid DTMF signal. Timing validation unit 408 will yield a new digit indication ND=DIGIT D if the timing constraints are met, or a NO_DIGIT indication ND=−1, if the timing constraints are not met. Details of timing validation unit 408 are shown in FIG. 6 and described below.

Figure 5:
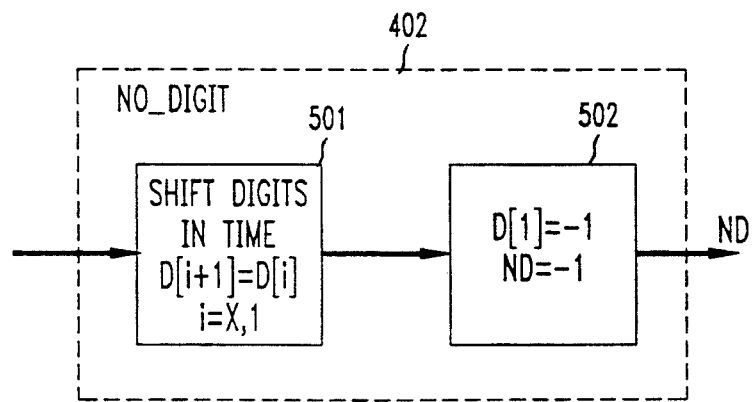
FIG. 5 shows, in simplified form, details of NO_DIGIT unit 402 employed in decision logic 110 of FIG. 4.

FIG. 5 shows, in simplified form, details of NO_DIGIT unit 402. NO_DIGIT unit 402 is employed to store a NO_DIGIT indication, i.e., ND=−1, in memory for the present N msec sample interval when it is determined that no valid DTMF signal has been detected in that N msec interval. Specifically, shown are shift digits in time unit 501 and NO_DIGIT indication generator 502. Shift digits in time unit 501 is employed to shift the last X digit indications in time, namely, D[i+1]=D[i], where i=X, 1. In this example, X=R+K=6 digit indications, where R=3 and K=3. As will be explained further below in conjunction with timing validation unit 408, it should be noted that only one of a number of shift digit units will be in control of the memory in which the digit indications are stored during any specific N msec interval. Once shift bits in time unit 501 has completed its operation of shifting the memory elements by one, we can now store the most recent NO_DIGIT indication D=−1 in memory location D[1] and supply as an output NO_DIGIT indication ND=−1 from unit 502.

Figure 6:
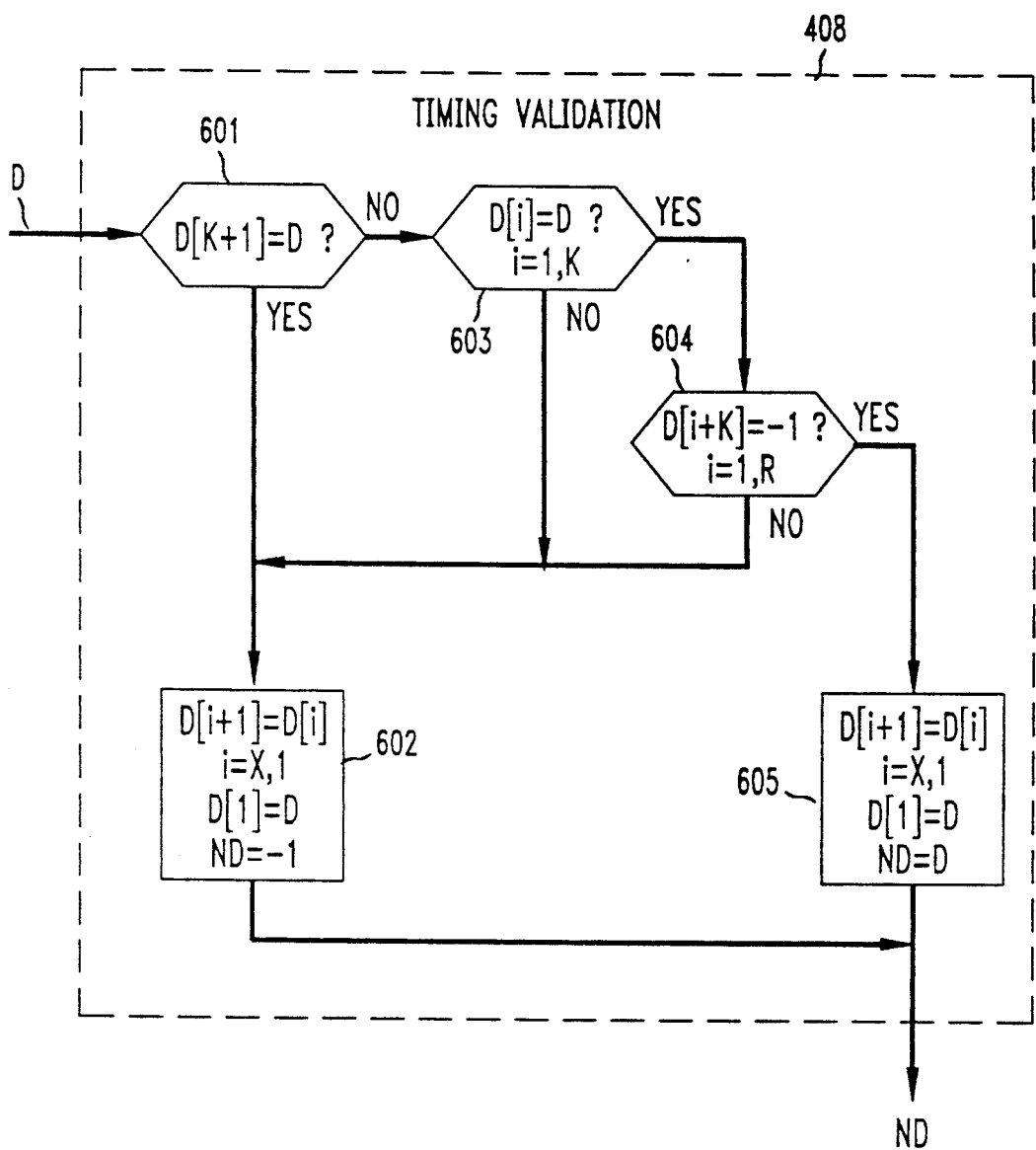
FIG. 6 shows, in simplified form, details of timing validation unit 407 of FIG. 4.

FIG. 6 shows, in simplified form, details of timing validation unit 408. Specifically, unit 601 performs a continuity test which determines if a currently detected digit, i.e., DTMF signal, is a continuing digit or a new digit by evaluating D[K+1]=D. K is the number of successive valid indications of a digit that is expected before a valid new digit is declared as being received. It is a function of the number of samples being used and the minimum duration acceptance and maximum duration rejection criteria. In this example, K is three (3) for N=5 msec, M=15 msec and a minimum acceptance duration of 30 msec and a maximum rejection duration of 23.5 msec. If the test result in unit 601 is YES, the current detected digit is a continuing digit and it is presumed that a new digit indication ND=D has been supplied as an output in a previous N msec interval. Unit 602 causes the prior X digits stored in memory to be shifted by one and to store D in memory position D[1], i.e., D[1]=D, and supply as an output ND=−1. This ND=−1 indicates that no new digit has been received during the current N msec interval. Returning to continuity test unit 601, if the test result is NO, then consistency test unit 603 determines if we have had K successive occurrences of the valid digit D. If the test result is NO, unit 602 causes the prior X digits stored in memory to be shifted by one (1) and to store D in memory position D[1], i.e., D[1]=D and to supply as an output ND=−1. Again, the ND=−1 indicates that no new digit has been received during the current N msec interval. If the test result in consistency test unit 603 is YES, unit 604 tests for the inter-digit timing. Unit 604 tests to determine whether R continuous ND=−1 digits have occurred before the K continuous occurrences of the digits D. R is the number of successive NO_DIGIT indications before K successive occurrences of a valid digit. It is a function of both N and M and the minimum inter-digit gap duration between successive new digits. As indicated above, in this example, N=5 msec, M=15 msec and the minimum inter-digit gap duration is 25 msec and R=3. If the test result in unit 604 is NO, we assume a valid digit has not been received. If the test result in unit 604 is YES, a valid new digit D has been received. Then, unit 605 causes the digits in memory to be shifted as above and to store the new digit D in the first memory position, i.e., D[1]=D. Then a new digit ND=D is supplied as an output.

The above-described arrangements are, of course, merely illustrative of the application of the principles of the invention. Other arrangements may be devised by those skilled in the art without departing from the spirit or scope of the invention. Although the invention has been described for use as a DTMF detector, it will be apparent that it could be used for detecting individual tones and the like. Additionally, the invention could equally be employed for detecting other multifrequency signals employing other tones, one example being, the known two-out-of-six multifrequency signaling scheme.

I claim:

1. A method for detecting one or more tones being received in a communications channel comprising the steps of:

applying a single discrete prolate spheroidal sequence (DPSS) taper to a prescribed portion of a signal received in said communications channel to produce a tapered version of said signal;

performing a plurality of Fourier transforms for each of a plurality of expected tones, a separate Fourier transform being performed at each of a corresponding plurality of prescribed frequencies related in a prescribed fashion to a nominal frequency of an expected tone of said tapered version of said received signal;

utilizing results of said Fourier transforms to obtain a frequency domain representation of energy for at least one of said plurality of expected tones;

obtaining a time domain representation of energy in said prescribed portion of said received signal; and using said time domain representation of energy and said frequency domain representation of energy to determine whether at least one valid tone has been received.

2. The method as defined in claim 1 wherein said step of using further includes accumulating a past history of such determinations of valid tones being received and employing said past history to determine whether a tone of vaid duration has been received.

3. The method as defined in claim 1 wherein said DPSS taper is a zeroth (0th) order DPSS taper having a predetermined bandwidth of $\pm W$ Hz.

4. The method as defined in claim 1 wherein said step of using said energy representations includes the steps of utilizing said time domain representation of energy to obtain a measure of impairment of the communications channel, employing said measure of impairment to obtain a set of tone acceptance threshold values and employing said set of tone acceptance threshold values in conjunction with said time domain representation of energy and said frequency domain representation of energy to determine whether a valid tone has been received.

5. The method as defined in claim 1 wherein said step of performing a plurality of Fourier transforms includes performing a plurality of Discrete Fourier Transforms (DFTs).

6. The method as defined in claim 5 wherein said step of utilizing the results of said DFTs uses the results of said DFTs to obtain frequency domain representations of energy for at least two of said plurality of expected tones and wherein said step of using uses said frequency domain representations of energy for said at least two of said plurality of expected tones to determine whether a valid signal including said at least two tones has been detected.

7. The method as defined in claim 6 wherein said plurality of tones includes a first group having a predetermined number of tones and a second group having a predetermined number of tones, wherein said step of utilizing the results of said DFTs employs the results of the DFTs for said tones in said first group to obtain a first frequency domain representation of energy and employs the results of the DFTs for said tones in said second group to obtain a second frequency domain representation of energy and wherein said step of using further uses said first and second frequency domain representations of energy to determine whether a valid signal including at least one tone from said first group and one tone from said second group has been detected.

8. The method as defined in claim 7 wherein the step of utilizing the results of said DFTs includes selecting the maximum amplitude DFT for each tone in said groups, selecting the maximum one of the DFT amplitudes for each tone in said first group and for each tone in said second group, summing said selected maximum DFT amplitudes in said first group and summing said selected maximum DFT amplitudes in said second group and wherein said step of using includes using the first group selected maximum DFT amplitude, the second group selected maximum DFT amplitude, the first group sum of selected maximum DFT amplitudes and the second group sum of selected maximum DFT amplitudes to determine whether a signal including valid first and second tones has been detected.

9. The method as defined in claim 8 wherein said step of using said energy representations further includes the steps of utilizing said time domain representation of energy to obtain a measure of impairment of the communications channel, employing said measure of impairment to obtain a set of tone acceptance threshold values and employing said obtained set of tone acceptance threshold values in conjunction with said time domain representation of energy and said frequency domain representations of energy to determine whether a valid signal including a tone from said first group and a tone from said second group has been detected.

10. The method as defined in claim 9 where said tones comprise dualtone multifrequency (DTMF) signals.

11. The method as defined in claim 9 wherein said step of obtaining said set of acceptance threshold values includes dynamically obtaining said set of acceptance threshold values from a plurality of sets based on said measure of impairment.

12. The method as defined in claim 11 wherein said step of obtaining a measure of impairment includes using said time domain representation of energy to obtain a measure of signal-to-noise ratio of the communications channel.

13. The method as defined in claim 12 wherein said prescribed portion of a signal received in the communications channel is obtained by accumulating a plurality of segments of said received signal, said prescribed portion being updated for each received segment of said received signal.

14. Apparatus for detecting one or more tones being received in a communications channel comprising:

means for applying a single discrete prolate spheroidal sequence (DPSS) taper to a prescribed portion of a signal received in said communications channel to produce a tapered version of said signal;

means for performing a plurality of Fourier transforms for each of a plurality of expected tones, a separate Fourier transform being performed at each of a corresponding plurality of prescribed frequencies related in a prescribed fashion to a nominal frequency of an expected tone of said tapered version of said received signal;

means for utilizing results of said Fourier transforms to obtain a frequency domain representation of energy for at least one of said plurality of expected tones;

means for obtaining a time domain representation of energy in said prescribed portion of said received signal; and means for using said time domain representation of energy and said frequency domain representation of energy to determine whether at least one valid tone has been received.

15. The apparatus as defined in claim 14 wherein said means for using further includes means for accumulating a past history of such determinations of valid tones being received and means for employing said past history to determine whether a tone of valid duration has been received.

16. The apparatus as defined in claim 14 wherein said DPSS taper is a zeroth (0th) order DPSS taper having a predetermined bandwidth of $\pm W$ Hz.

17. The apparatus as defined in claim 14 wherein said means for using said energy representations includes means for obtaining a measure of impairment of the communications channel employing said time domain energy representation, means for obtaining a set of tone acceptance threshold values based on said measure of impairment and means employing said set of tone acceptance threshold values in conjunction with said time domain representation of energy and said frequency domain representation of energy for determining whether a valid tone has been received.

18. The apparatus as defined in claim 14 wherein said means for performing a plurality of Fourier transforms includes a plurality of means for performing Discrete Fourier Transforms (DFTs).

19. The apparatus as defined in claim 18 wherein said means for obtaining said set of acceptance threshold values includes means for dynamically obtaining said set of acceptance threshold values from a plurality of sets based on said measure of impairment.

20. The apparatus as defined in claim 19 wherein said means for obtaining a measure of impairment includes means supplied with said time domain representation of energy for obtaining a measure of signal-to-noise ratio of the communications channel.

21. The method as defined in claim 18 wherein said means for utilizing the results of said DFTs includes means for using the results of said DFTs for obtaining frequency domain representations of energy for at least two of said plurality of expected tones and wherein said means for using includes means for using said frequency domain representations of energy for said at least two of said plurality of expected tones to determine whether a valid signal including said at least two tones has been detected.

22. The apparatus as defined in claim 21 wherein said plurality of tones includes a first group having a predetermined number of tones and a second group having a predetermined number of tones, wherein said means for utilizing the results of said DFTs includes means for employing the results of the DFTs for said tones in said first group to obtain a first frequency domain representation of energy and for employing the results of the DFTs for said tones in said second group to obtain a second frequency domain representation of energy and wherein said means for using further includes means for using said first and second frequency domain representations of energy for determining whether a valid signal including at least one tone from said first group and one tone from said second group has been detected.

23. The apparatus as defined in claim 22 wherein said means for utilizing the results of said DFTs includes means for selecting the maximum amplitude DFT for each tone in said groups, means for selecting the maximum one of the DFT amplitudes for each tone in said first group and for each tone in said second group, means for summing said selected maximum DFT amplitudes in said first group and means for summing said selected maximum DFT amplitudes in said second group and wherein said means for using includes means for using the first group selected maximum DFT amplitude, the second group selected maximum DFT amplitude, the first group sum of selected maximum DFT amplitudes and the second group sum of selected maximum DFT amplitudes to determine whether a signal including valid first and second tones has been detected.

24. The apparatus as defined in claim 23 wherein said means for using said energy representations further includes means for utilizing said time domain representation of energy to obtain a measure of impairment of the communications channel, means for employing said measure of impairment to obtain a set of tone acceptance threshold values and means for employing said obtained set of tone acceptance threshold values in conjunction with said time domain representation of energy and said frequency domain representations of energy to determine whether a valid signal including a tone from said first group and a tone from said second group has been detected.

25. The method as defined in claim 24 where said tones comprise dual-tone multifrequency (DTMF) signals.

26. The apparatus as defined in claim 20 wherein said prescribed portion of a signal received in the communications channel is obtained by accumulating a plurality of segments of said received signal, said prescribed portion being updated for each received segment of said received signal.

* * * * *